(12) United States Patent
Hoffmann et al.

(10) Patent No.: US 7,634,915 B2
(45) Date of Patent: *Dec. 22, 2009

(54) SYSTEMS AND METHODS FOR POWER GENERATION AND HYDROGEN PRODUCTION WITH CARBON DIOXIDE ISOLATION

(75) Inventors: Stephanie Marie-Noelle Hoffmann, Munich (DE); Michael Adam Bartlett, Munich (DE)

(73) Assignee: General Electric Company, Niskayuna, NY (US)

( * ) Notice: Subject to any disclaimer, the term of this patent is extended or adjusted under 35 U.S.C. 154(b) by 632 days.

This patent is subject to a terminal disclaimer.

(21) Appl. No.: 11/302,554

(22) Filed: Dec. 13, 2005

(65) Prior Publication Data

US 2007/0130957 A1   Jun. 14, 2007

(51) Int. Cl.
   *F02C 3/28*   (2006.01)
   *F02C 6/08*   (2006.01)
   *F02C 6/18*   (2006.01)

(52) U.S. Cl. ............... 60/780; 60/39.12; 60/39.15; 60/39.53

(58) Field of Classification Search ............ 60/780, 60/39.12, 39.15, 39.181, 39.53
   See application file for complete search history.

(56) References Cited

U.S. PATENT DOCUMENTS

| | | | | |
|---|---|---|---|---|
| 2,621,475 A | * | 12/1952 | Loy | .......... 60/39.17 |
| 2,654,216 A | * | 10/1953 | Traupel | .......... 60/39.17 |
| 2,655,788 A | * | 10/1953 | Sedille | .......... 60/39.5 |
| 5,255,504 A | * | 10/1993 | Hodrien et al. | .......... 60/39.12 |
| 5,927,063 A | * | 7/1999 | Janda et al. | .......... 60/780 |
| 6,260,348 B1 | | 7/2001 | Sugishita et al. | |
| 6,430,916 B2 | | 8/2002 | Sugishita et al. | |
| 6,832,485 B2 | | 12/2004 | Sugarmen et al. | |
| 6,976,362 B2 | * | 12/2005 | Sheppard et al. | .......... 60/39.12 |

(Continued)

FOREIGN PATENT DOCUMENTS

WO   WO2004/072443 A1   8/2004

*Primary Examiner*—Ted Kim
(74) *Attorney, Agent, or Firm*—Patrick K. Patnode (57) ABSTRACT

A power generation system includes a first gas turbine system. The first turbine system includes a first combustion chamber configured to combust a first fuel stream of primarily hydrogen that is substantially free of carbon-based fuels, a first compressor configured to supply a first portion of compressed oxidant to the first combustion chamber and a first turbine configured to receive a first discharge from the first combustion chamber and generate a first exhaust and electrical energy. The power generation system further includes a second gas turbine system. The second turbine system includes a second combustion chamber configured to combust a second fuel stream to generate a second discharge, wherein the first compressor of the first gas turbine system is configured to supply a second portion of compressed oxidant to the second combustion chamber and a second turbine configured to receive the second discharge from the second combustion chamber to generate a second exhaust and electrical energy. A second compressor is configured to receive the second exhaust comprising carbon dioxide and to discharge a recycle stream to the second combustion chamber and a split stream to a separator system adapted to recover carbon dioxide. The power generation system also includes a hydrogen generation system configured to receive a third fuel and steam to generate the first fuel and a third exhaust gas, wherein the third exhaust gas is recycled into the second combustion chamber.

17 Claims, 2 Drawing Sheets

U.S. PATENT DOCUMENTS

| | | | |
|---|---|---|---|
| 7,266,940 B2 * | 9/2007 | Balan et al. | 60/39.181 |
| 2004/0216465 A1 * | 11/2004 | Sheppard et al. | 60/39.12 |
| 2005/0126156 A1 | 6/2005 | Anderson et al. | |
| 2006/0112696 A1 * | 6/2006 | Lynghjem et al. | 60/39.181 |

* cited by examiner

SYSTEMS AND METHODS FOR POWER GENERATION AND HYDROGEN PRODUCTION WITH CARBON DIOXIDE ISOLATION

BACKGROUND OF THE INVENTION

The invention relates generally to power generation and the efficient recovery of carbon dioxide. More particularly, the invention relates to the integration of power generation plants with hydrogen production and carbon dioxide separation and recovery.

Currently, the most cost effective method of producing hydrogen is centralized steam reforming of fuels such as natural gas. Rising energy prices and concern for the environment are prompting increased attention to hydrogen as an energy source. Hydrogen has been proposed as a clean fuel for the future with many applications including for use with vehicles and with stationary power.

Power generation systems that combust fuels containing carbon for example, fossil fuels, produce carbon dioxide ($CO_2$) as a byproduct as carbon is converted to $CO_2$ during the combustion process. Currently, there is a trend towards increasing economic and legislative constraints on $CO_2$ emissions to the atmosphere from power plants, for example, Kyoto Protocol, emission taxes, European Emissions Trading Scheme, etc. Removal or recovery of the carbon dioxide ($CO_2$) from power generation systems, such as from the exhaust of a gas turbine, is generally not economical due to low $CO_2$ content and low (ambient) pressure of the exhaust. Therefore, unfortunately, the exhaust containing the $CO_2$ is typically released to the atmosphere, and does not get sequestered into oceans, mines, oil wells, or geological saline reservoirs. There is a need for a technique that provides for economical recovery of $CO_2$ discharged from power generation systems that rely on carbon-containing fuels.

Accordingly there is a need for a co-production system for producing hydrogen and electrical energy that can economically recover $CO_2$ discharged from the co-production system.

BRIEF DESCRIPTION OF THE INVENTION

In one aspect, a power generation system includes a first gas turbine system. The first turbine system includes a first combustion chamber configured to combust a first fuel stream of primarily hydrogen that is substantially free of carbon-based fuels, a first compressor configured to supply a first portion of compressed oxidant to the first combustion chamber and a first turbine configured to receive a first discharge from the first combustion chamber and generate a first exhaust and electrical energy. The power generation system further includes a second gas turbine system. The second turbine system includes a second combustion chamber configured to combust a second fuel stream to generate a second discharge, wherein the first compressor of the first gas turbine system is configured to supply a second portion of compressed oxidant to the second combustion chamber and a second turbine configured to receive the second discharge from the second combustion chamber to generate a second exhaust and electrical energy. A second compressor is configured to receive the second exhaust comprising carbon dioxide and to discharge a recycle stream to the second combustion chamber and a split stream to a separator system adapted to recover carbon dioxide. The power generation system also includes a hydrogen generation system configured to receive a third fuel and steam to generate the first fuel and a third exhaust gas, wherein the third exhaust gas is recycled into the second combustion chamber.

In another aspect, a power generation system includes a first turbine system configured to combust a first fuel comprising a hydrogen-rich stream substantially free of carbon-based fuels and to discharge a first exhaust substantially free of carbon dioxide The power generation system further includes a second turbine system configured to combust a second carbon-based fuel and to discharge a compressed stream rich in carbon dioxide to a carbon dioxide separator adapted to recover the carbon dioxide, wherein a compressor in the first turbine system is configured to supply air to the second turbine system. The power generation system also includes a hydrogen generation system configured to receive a third fuel to generate the hydrogen-rich stream and an exhaust gas, wherein the exhaust gas is combusted in said second turbine system. The power generation system does not discharge substantial amounts of carbon dioxide to the atmosphere.

In yet another aspect, a power generation system includes a first gas turbine system comprising a first combustion chamber configured to combust a first fuel stream comprising hydrogen carbon monoxide, carbon dioxide and nitrogen. The first gas turbine system also includes a first compressor configured to supply a first portion of compressed oxidant to the first combustion chamber and a first turbine configured to receive a first discharge from the first combustion chamber and generate a first exhaust and electrical energy. The power generation system further includes a second gas turbine system comprising a second combustion chamber configured to combust a second fuel stream to generate a second discharge, wherein the first compressor of the first gas turbine system is configured to supply a second portion of compressed oxidant to the second combustion chamber. The second turbine system also includes a second turbine configured to receive the second discharge from the second combustion chamber to generate a second exhaust and electrical energy and a second compressor configured to receive the second exhaust comprising carbon dioxide and to discharge a recycle stream to the second combustion chamber and a split stream to a separator system adapted to recover carbon dioxide. The power generation system also includes hydrogen generation system configured to receive a third fuel and a third portion of compressed oxidant from the first compressor to generate the first fuel.

In another aspect, a method comprising reforming a carbon based fuel in a hydrogen generation system and generating an exhaust gas and combusting the hydrogen and a first portion of compressed oxidant in a first turbine system. The method further includes discharging a first exhaust from the first turbine system that is substantially free of carbon dioxide, introducing a second portion of compressed air from the first turbine system to a second turbine system and combusting carbon-based compounds and the exhaust gas from the hydrogen generation system in the second turbine system and generating a second exhaust comprising carbon dioxide. The method also includes internally recycling within the second turbine system the second exhaust of said second turbine system to concentrate carbon dioxide within the second turbine system and recovering the carbon dioxide from the second exhaust in a carbon dioxide separator.

DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

The present technique provides for two or more exemplary gas turbine systems operating in a power generation system to share a common supply of compressed oxidant. As a result, compression capacity may be freed in one or more of the turbine systems to be employed in the recovery of carbon dioxide ($CO_2$) generated by one or more of the turbine systems. In one example, a compressor in a first turbine system supplies oxidant (via conduits) to a combustion chamber in the first turbine system and also to a combustion chamber in a second turbine system, freeing a compressor in the second turbine system. As discussed below, this freed compression capacity may be employed in the separation and recovery of carbon dioxide ($CO_2$) and other components from the exhaust of one or more of the gas turbines. The recovered $CO_2$ may be sold as product or consumed on-site as feed in other processes, for example. Further, such recovery of $CO_2$ may reduce the amount of $CO_2$ emitted to the environment from the power generation system. Additionally, as discussed below, the reforming (e.g., via steam) of hydrocarbon fuel may be integrated with operation of the gas turbine systems to further reduce the amount of $CO_2$ emitted to the environment.

In certain configurations, at least one turbine system (i.e., the first turbine system) may combust hydrogen and, therefore, discharge an exhaust having substantially no carbon dioxide. Moreover, the hydrogen feed may be generated locally by reforming carbon-based fuels (e.g., natural gas, propane, etc.), for example. Another turbine system (i.e., the second turbine system) may combust hydrocarbons or carbon-based fuels and, therefore, discharge an exhaust having carbon dioxide. As indicated, the freed compressor in the second turbine system may be utilized to facilitate separation and recovery of $CO_2$ from the exhaust of the second turbine, and ultimately reduce emissions from the second turbine system. Advantageously, the overall result may be a power generation system that consumes carbon-based fuels such as natural gas without emitting substantial amounts of $CO_2$ to the environment. Again, the recovered $CO_2$ may also provide an economic benefit, for example, being sold or consumed locally or captured and distributed. Furthermore the hydrogen reforming system generates an exhaust stream at high temperature, which may also contain un-reacted fuel, which exhaust stream is advantageously fed to, and when containing un-reacted fuel, combusted, in the second turbine system to decrease the fuel consumption in the second turbine system and hence increase the overall efficiency of the power generation system.

Further, the present technique may encompass a variety of process configurations, including the employment of more than two turbine systems, the feeding of exhaust having $CO_2$ from one turbine system combusting hydrocarbon to a compressor in another turbine system also combusting hydrocarbon, and potentially many other configurations. While this invention is described in exemplary form below, these are only examples of possible configurations and are not limitations of this invention.

Figure 1:
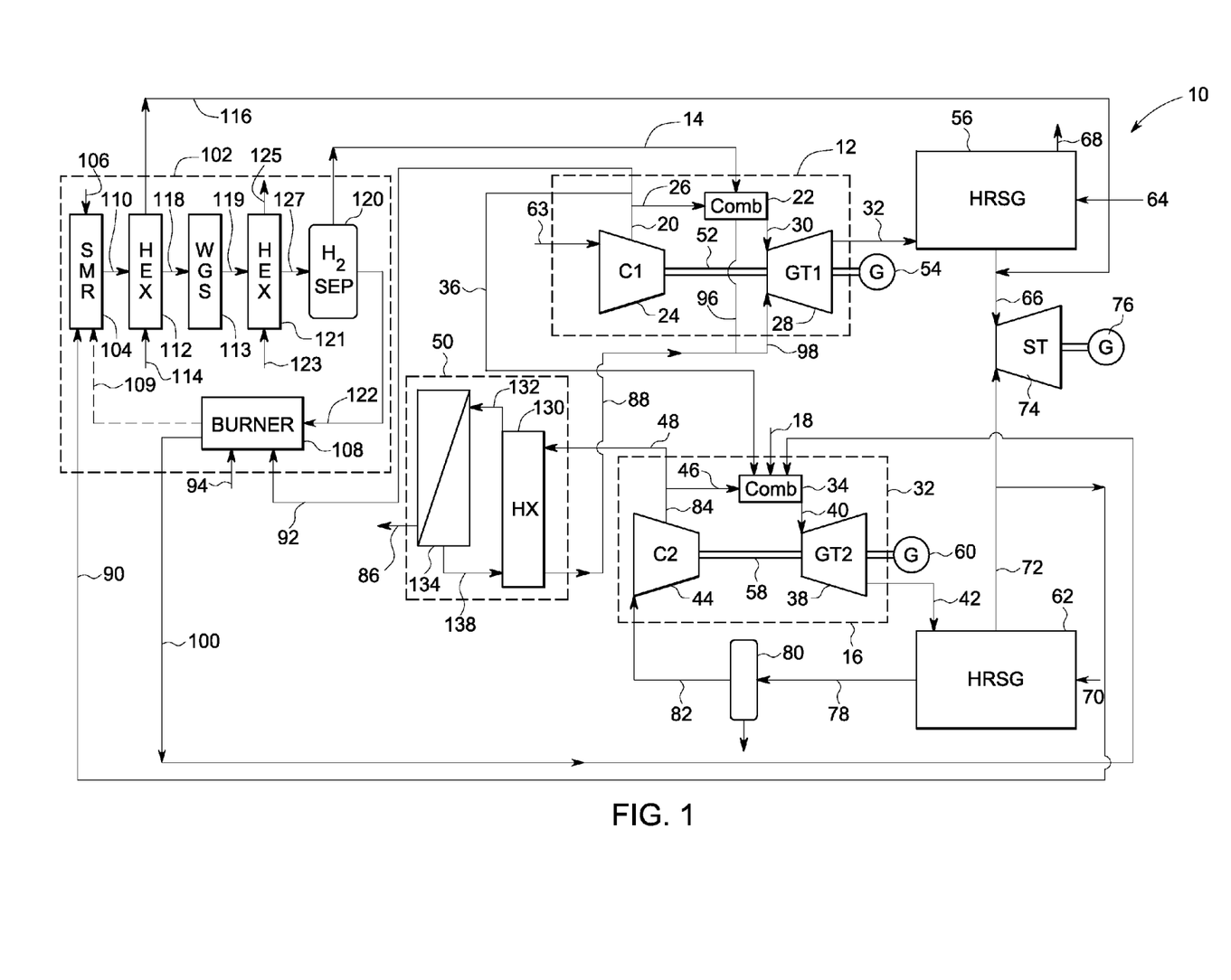
FIG. 1 illustrates an exemplary co-production system for hydrogen and electrical energy using steam methane reforming.

Turning now to the drawings, FIG. 1 illustrates an exemplary power generation system 10 having a first gas turbine system 12 configured for hydrogen feed 14 and a second gas turbine system 16 configured for hydrocarbon feed 18, for example natural gas, propane, etc. In the illustrated embodiment, oxidant is supplied via oxidant conduit 20 from the first gas turbine system 12 to the second gas turbine system 16.

In this example, the first turbine system 12 includes a first combustion chamber 22 configured to combust a first fuel stream (hydrogen feed 14) of primarily hydrogen that is substantially free of carbon-based fuels, a first compressor 24 configured to supply a first portion of compressed oxidant 26 to the first combustion chamber 22, and a first turbine 28 configured to receive a first discharge 30 from the first combustion chamber 22 and generate a first exhaust 32 and electrical energy. The exemplary power generation system 10 may also include a second gas turbine system 16 having a second combustion chamber 36 configured to combust a second fuel stream (hydrocarbon feed 18), wherein the first compressor 22 of the first gas turbine system 12 is configured to supply oxidant 20 (a second portion of the compressed oxidant 36) to the second combustion chamber 34. The second turbine system 16 may further include a second turbine 38 configured to receive the second discharge 40 from the second combustion chamber 34 to generate a second exhaust 42 and electrical energy and a second compressor 44 configured to receive the second exhaust 42 comprising carbon dioxide and to discharge a recycle stream 46 to the second combustion chamber 34 and a split stream 48 to a separator system 50 adapted to recover carbon dioxide from the split stream 48.

The exemplary power generation system further comprises a hydrogen generation system 102. The hydrogen generation system is configured to receive a third fuel 106 and steam 90 to generate a third exhaust gas 100, which exhaust gas 100 comprises un-reacted fuel. In the exemplary embodiment, as shown in FIG. 1, the third exhaust gas 100 is recycled at a high temperature and pressure into the second combustion chamber 34 to utilize the energy content of this gas in a way that is advantageous over rejecting this energy directly to the steam bottoming cycle.

In the illustrated embodiment, the first turbine system 12 typically includes a compressor 24, a turbine 28, a rotor 52, by which rotor 52 turbine 28 drives compressor 24. The first turbine system 12 also comprises an electrical generator 54, and a first heat recovery steam generator (hereinafter HRSG) 56. Similarly the second turbine system 16 typically includes a compressor 44, a turbine 38, a rotor 58, by which rotor 58 turbine 38 drives compressor 44. The second turbine system 16 also comprises an electrical generator 60, and a second heat recovery steam generator (hereinafter HRSG) 62.

In operation, exemplary compressors 24 and 44 are multi-stage compressors that include rows of stationary vanes and rotating blades. Compressor 24 inducts air 63 and produces a compressed air stream 20. In some embodiments, the compressed air stream 20 is spilt into two or three streams. A first portion of the compressed air 26 is introduced into the first combustion chamber 22. The first combustion chamber 22 is configured to receive the first fuel stream 14 and the first portion of compressed oxidant 26. The first fuel stream 14 and the oxidant stream 26 may be premixed and injected into the first combustion chamber 22. In some embodiments, the first fuel 14 and the first portion of compressed oxidant 26 may be injected separately into the first combustion chamber 22. In the various embodiments of the power generation systems described herein, the oxidant is ambient air. It is understood that the compressed oxidant 20 from the compressor 24 may comprise any other suitable gas containing oxygen, such as for example, oxygen rich air, oxygen depleted air, and/or pure oxygen. The combustion process in the first combustion chamber 22 generates a first discharge stream 30.

As illustrated, the first discharge stream 30 from the first combustion chamber 22 may be introduced into the first gas turbine 28. As indicated, the power generation system 10 includes a generator 54 attached to the first gas turbine 28. The thermodynamic expansion of the hot first discharge stream 30 fed into the first gas turbine 28 produces power to drive the gas turbine 28, which, in turn, generates electricity through the generator 54. In this embodiment, electricity from the generator 54 may be converted to an appropriate form and is provided to a distribution power supply network grid (not shown). An expanded first exhaust 32 from the first gas turbine 28 may be fed into the first HRSG 56 for recovering the heat content of the expanded first exhaust stream 32. A water stream 64 may be fed into the first HRSG 56, which in turn may generate a first portion of steam 66 at least in part by utilizing the heat recovered from the hot expanded first exhaust stream 32 from the first gas turbine 28. The cooled first exhaust 68 from the first HRSG 56 may be vented into the atmosphere.

The first fuel stream 14 introduced in the first combustion chamber 22 is typically substantially free of any carbon content and may include a relatively high concentration of hydrogen. The source of such quality of fuel may include but is not limited to pipeline supply, truck supply, tube trailer supply, vessels (i.e., spherical storage), a hydrogen storage system capable of storing gaseous or liquid hydrogen, and so on. Alternatively, as shown in FIG. 1, hydrogen can be generated on-site via reforming of hydrocarbons (e.g., via steam) or other processes and used as the first fuel stream 14 for the first turbine system 12 as illustrated in an exemplary system in FIG. 2.

As depicted in FIG. 1, a second portion of compressed oxidant 36 from the first compressor 24 is introduced into the second combustion chamber 34 of the second turbine system 16. A second fuel stream 18 may also be introduced into the second combustion chamber 34 to produce the second discharge stream 40. The second discharge stream 40 is typically expanded in the second turbine 38 to generate the second exhaust stream 42 which exhaust stream 42 may be introduced into the second HRSG 62. In this embodiment, the second HRSG 62 is generally a closed loop HRSG wherein no stream is typically vented into the atmosphere. The heat content of the second exhaust stream 42 may be recovered by a water stream 70 to produce a second portion of steam 72. The first portion of steam 66 generated in the first HRSG 56 and the second portion of the steam 72 generated in the second HRSG 62 may be used in a steam turbine 74 to produce electrical energy through a generator 76, for example.

The second fuel stream 18 may include any suitable hydrocarbon gas or liquid, such as natural gas, methane, naphtha, butane, propane, synthesis gas, diesel, kerosene, aviation fuel, coal derived fuel, bio-fuel, oxygenated hydrocarbon feedstock, and mixtures thereof, and so forth. In one embodiment, the fuel is primarily natural gas (NG) and, therefore, the second discharge stream 40 from the second combustion chamber 34 may include water, carbon dioxide ($CO_2$), carbon monoxide (CO), nitrogen ($N_2$) unburned fuel, and other compounds.

The cooled second exhaust stream 78 from the second HRSG 62 is generally cooled further in a condenser 80, where the water formed in the combustion process in the second combustion chamber 34 is separated from the second cooled exhaust stream 78. The exit stream 82 from the condenser 80 typically includes at least $CO_2$, CO, $N_2$ and unburned hydrocarbon. The exit stream 82 is generally compressed in the second compressor 44 to generate a compressed stream 84. In operation, during the initial phase of operation after start-up, the concentration of $CO_2$ in the compressed stream 84 may not be substantial and hence the entire stream may be recycled back to the second combustion chamber 34 as a recycle stream 46. This recycling operation generally increases the $CO_2$ concentration in the compressed stream 84. When the $CO_2$ concentration in the compressed stream 84 reaches a desired level, a slip stream or split stream 48 may be introduced into the downstream $CO_2$ separator unit 50. A control valve configuration (not shown) may be employed to facilitate diversion and introduction of the split stream 48 to the $CO_2$ separator. For example, a control valve may be disposed on the conduit carrying the split stream, and the operation of the control valve tied to an on-line instrument or sensor that measures the concentration $CO_2$ in the compressed stream 84. Lastly, the downstream $CO_2$ separator unit 50 may generate an exit stream 86 having substantially high concentration of $CO_2$ and a lean $CO_2$ stream 88 primarily having CO, unburned fuel and $N_2$.

As discussed earlier, the exemplary power generation system 10 further comprises a hydrogen generation system 102. In this example, the hydrogen generation system 102 may include a steam-reforming zone 104. A fuel 106 such as natural gas and steam are typically introduced into the reforming zone 104 to produce a reformate stream 110. In some embodiments, the steam for the reforming process is supplied by a portion of steam 90 generated in the second HRSG 62.

Typically, reforming a hydrocarbon fuel, such as natural gas, with steam, produces hydrogen. This process is generally energy intensive (i.e., the steam reforming reaction is endothermic) and significant heat may be absorbed in the overall reforming process. In the example of natural gas, the main constituent is methane ($CH_4$), which reacts with steam in a two-step reaction to produce hydrogen. Through the reforming process, natural gas may be converted to hydrogen following the reactions (1) and (2):

$$CH_4 + H_2O \Rightarrow CO + 3H_2 \quad (1)$$

$$CO + H_2O \Rightarrow CO_2 + H_2 \quad (2)$$

At least a portion of the incoming fuel 106 is converted to generate hydrogen by the reforming process in the reforming zone 104. The reforming reaction (1) generally takes place in presence of a suitable steam reforming catalyst, such as nickel. The reforming reaction (1) is typically highly endothermic, having a heat of reaction of approximately 88,630 BTU/mole. Reforming reactions of other hydrocarbon fuels are similarly endothermic. The carbon monoxide and water may react further to produce carbon dioxide in the reforming zone 104. The reformate stream 110 typically includes at least carbon monoxide (CO), carbon dioxide ($CO_2$), hydrogen ($H_2$), unutilized fuel, and water. The hydrogen generation system 102 may include at least one heat exchanger. In one embodiment, as shown in FIG. 1, the hydrogen generation system 102 may include a first heat exchanger 112, a water gas shift reactor 113, a second heat exchanger 121 and a hydrogen separator 120. The reformate stream 110 may be cooled to a temperature within the range of about 200° C. to about 400° C. using the heat exchanger 112 to generate a cooled reformate stream 118. Other exemplary temperature ranges include about 225° C. to about 375° C., and about 250° C. to about 350° C. The cooled reformate stream 118 may be introduced into the water gas shift reactor 113. The water gas shift reaction as shown in reaction (2) takes place in the water gas shift reactor 113. The water gas shift reaction is an exothermic reaction and generates an heated second reformate stream 119. The heated second reformate stream 119 is introduced into the second heat exchanger 121. The second heat exchanger 121 is configured to generate steam 125 from a water stream 123 by utilizing the heat content of the heated second reformate stream 119 and generate a cooled second reformate stream 127. The cooled second reformate stream 127 is introduced into the separation unit 120, which separation unit 120 separates hydrogen from the cooled reformate stream 118 and produces a hydrogen rich steam 14, and an off gas stream 122.

The inlet fuel stream 106 may comprise any suitable gas or liquid, such as natural gas, methane, naphtha, butane, propane, diesel, kerosene, aviation fuel, coal-derived fuel, bio-fuel, oxygenated hydrocarbon feedstock, and mixtures thereof. Commonly, in some embodiments, the fuel is natural gas (NG).

In the illustrated embodiment, the heat exchanger 112 is configured to extract the heat from the reformate stream 110 and utilize that heat to generate the steam 116 from water 114. In some embodiments, the steam 116 is sent to the steam turbine 74 along with the first portion of steam 66 to generate power. The off gas 122 from the hydrogen separator 120 may include water, CO CO2, unburned fuel and hydrogen. In certain embodiments, the off gas stream 122 is mixed with supplemental fuel and oxidant such as air through the stream 92 and introduced in a burner 108 to generate heat (as shown by the dotted line 109) for the endothermic reforming reaction in the reforming zone 104. In some embodiment, a third portion of the compressed oxidant 92 from the first compressor 24 is used for the combustion of the off gas stream 122 and optionally a fuel 94. Although the exemplary embodiment as shown in FIG. 1 illustrates the steam methane reforming to be the process for making hydrogen, any other process including but not limited to auto-thermal reforming, partial oxidation, catalytic partial oxidation may also be used.

The techniques to separate hydrogen from other gases to produce a substantially pure hydrogen rich stream 14 may include pressure swing adsorption (PSA), reverse osmosis, molecular sieve, membrane separation, and other separation techniques. With membranes in particular, a variety of polymers may be used for hydrogen selective membranes, which operate at relatively low temperatures, for example.

In some embodiments, the hydrogen separator 120 may use a cryogenic separation technique. Cryogenic separation may be used when it is important to recover multiple fractionates and multiple products. In one embodiment, the cooled reformate stream 118 is compressed to approximately 900 psia and then cooled to room temperature using a condenser, which liquefies the $CO_2$. Hydrogen can be recovered as a gas from this process, while the $CO_2$ is generally removed as liquid from the bottom of the condenser.

In the illustrated embodiment of FIG. 1, the burner 108 is configured to generate an exhaust stream 100 comprising, $O_2$, $CO_2$, and nitrogen. In this embodiment, the exhaust stream 100 is introduced to the second combustion chamber 34 to recover the high temperature heat content in this exhaust stream 100 instead of rejecting it to the steam cycle. Further, returning the compressed exhaust stream 100 to the second gas turbine balances the flows, requiring little or no modifications in the machineries in an existing turbine system. It also helps recovering the unused oxygen from the burner 108. The use the heat in the exhaust stream 100 from the burner 108 in the second combustion chamber 34 reduces the fuel consumption in the second combustion chamber 34. As the temperature of the exhaust stream 100 is typically higher then the temperature of the recycle stream 46 fed into the second combustion chamber 34, the average temperature of the fluid entering the second combustion camber 34 may be raised resulting in reduction in fuel consumption. In some embodiments, the off-gas 122 and the third fuel 94 is burned in the burner 108 in presence of an excess of an oxidant such as air ensuring complete combustion of the fuel. In this process the $CO_2$ generated in the reforming process is also captured in the closed loop $CO_2$ separation process as illustrated in FIG. 1.

As shown in the embodiment of FIG. 1, the $CO_2$ separator unit 50 has a heat exchanger 130 and a $CO_2$ separator 134. The carbon dioxide separator 134 may apply various techniques known in the art, including but not limited to pressure swing adsorption, chemical absorption and membrane separation, and so forth. To separate the $CO_2$ from the split stream 48. The split stream 48 is introduced into the heat exchanger 130 to reduce the temperature and produce a cooled split stream 132. The cooled split stream 132 is introduced in the $CO_2$ separator 134 to generate a $CO_2$ rich stream 86 and a $CO_2$ lean stream 138. The $CO_2$ lean stream 138 further comprises CO, $N_2$ and un-reacted fuel. The $CO_2$ lean stream 138 is introduced in the heat exchanger 130 to recover the heat content in the split stream 48 and generate a heated lean $CO_2$ stream 96. In one embodiment, a first portion of the heated lean $CO_2$ stream 96 is introduced into the first combustion chamber 14 to dilute the combustion gases to control the flame temperature. A second portion of the $CO_2$ lean stream 98 is sent to the first turbine 28 for turbine cooling. In conventional power generation systems, a substantial amount of the compressed air is used for turbine cooling. By using the $CO_2$ lean stream 98 for turbine cooling increases the efficiency of the power plant.

Pressure swing adsorption (PSA) may be used for separation of carbon dioxide from a mixture of gases. In PSA techniques, at a high partial pressure, solid molecular sieves can adsorb carbon dioxide more strongly than other gases. As a result, at elevated pressures, carbon dioxide is removed from the mixture of gases this mixture is passed through an adsorption bed. Regeneration of the bed is accomplished by depressurization and purging. Typically for critical operations, a plurality of adsorption vessels is used for continuous separation of carbon dioxide, wherein one adsorption bed is used while the others are regenerated.

Another technique for separation of carbon dioxide from a gas stream is chemical absorption using oxides, such as, calcium oxide (CaO) and magnesium oxide (MgO) or a combination thereof. In one embodiment, at elevated pressure and temperature, $CO_2$ is absorbed by CaO forming calcium carbonate ($CaCO_3$), thereby removing $CO_2$ from the gas mixture. The sorbent CaO is regenerated by calcinations of $CaCO_3$, which can again reform $CaCO_3$ to CaO.

Membrane separation technology may also be used for separation of carbon dioxide from a gas stream. Membrane processes are generally more energy efficient and easier to operate than absorption processes. The membranes used for high temperature carbon dioxide separation include zeolite and ceramic membranes, which are selective to $CO_2$. However, the separation efficiency of membrane technologies is low, and complete separation of carbon dioxide may not be achieved through membrane separation. Typically membrane separators work more efficiently at higher pressures, and use of a membrane separator to separate the carbon dioxide from the split stream 48 from the second compressor 44 is facilitated by the elevated pressure achieved through the compression in the second compressor 44. The higher pressure available for the separation of $CO_2$ from the split stream 48 also reduces the size of the CO₂ separator 134, thereby enhancing the feasibility and the economics of the CO₂ separation process.

Yet another technique used for separation of CO₂ from the split stream 80 may include, but is not limited to, chemical absorption of CO₂ using amines. The split stream 48 may be cooled to a suitable temperature to use chemical absorption of carbon dioxide using amines. This technique is based on alkanol amines solvents that have the ability to absorb carbon dioxide at relatively low temperatures, and are easily regenerated by raising the temperature of the rich solvents. A carbon dioxide rich stream 86 is obtained after regeneration of the rich solvent. The solvents used in this technique may include triethanolamine, monoethanolamine, diethanolamine, diisopropanolamine, diglycolamine, and methyldiethanolamine. Another technique for separating CO₂ may be physical absorption. It may be noted that all or combination of any of the techniques described above for CO₂ separation may be used to separate CO₂ advantageously In this exemplary embodiment as depicted in FIG. 1, substantial carbon dioxide isolation is achieved. As the fuel burned in the first combustion chamber 22 may be substantially pure hydrogen, carbon dioxide is generally not formed during the combustion process in the first combustion chamber 22. The first exhaust 32, generated from the first combustion chamber 22 therefore is free from carbon dioxide and the cooled first exhaust stream 68 vented to atmosphere typically does not release any carbon dioxide. The carbon dioxide produced in the second combustion chamber 34 may be isolated as a concentrated carbon dioxide stream 86 that may be sequestrated or sold in the merchant market depending on the demand for carbon dioxide.

Figure 2:
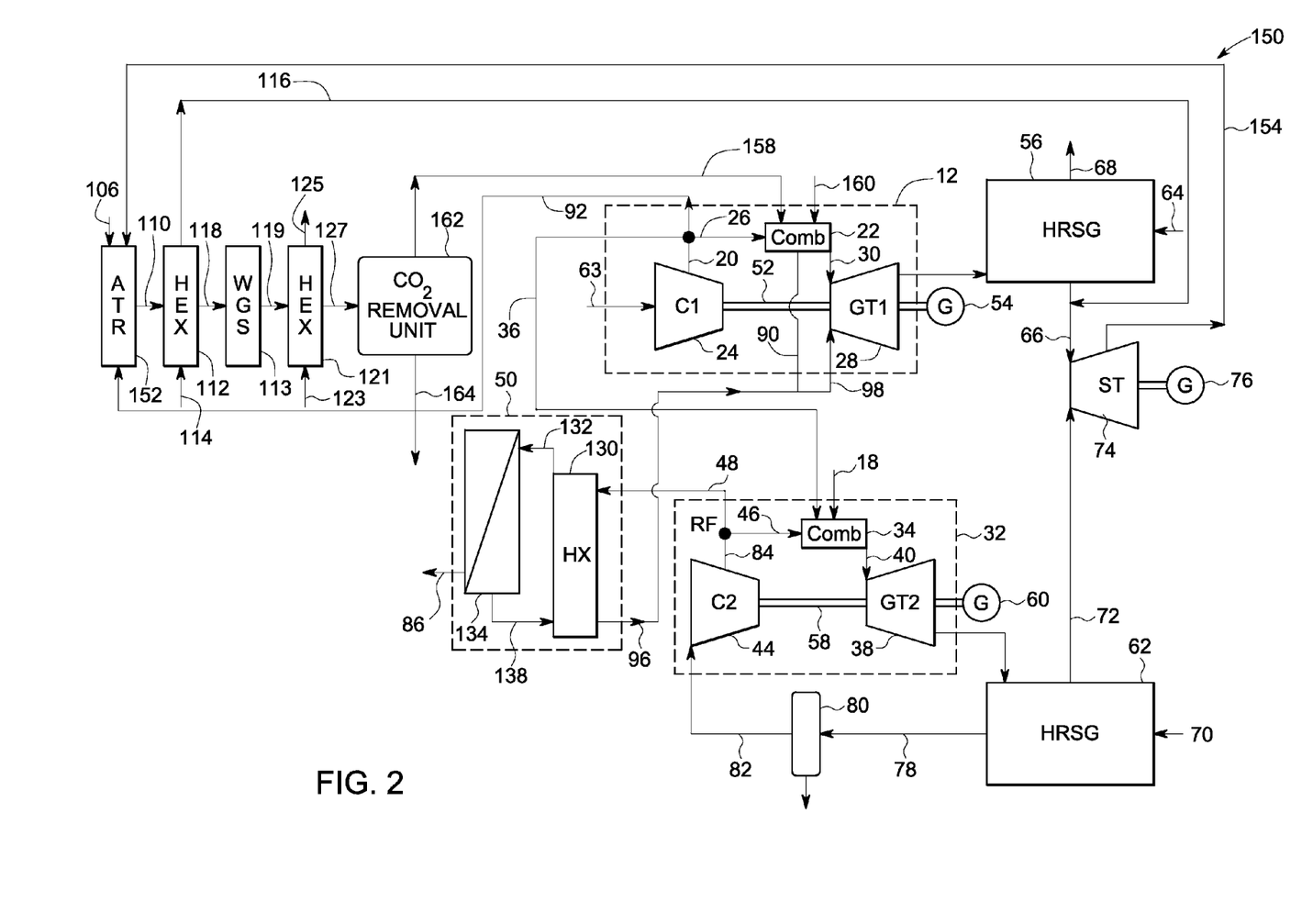
FIG. 2 illustrates another exemplary co-production system for hydrogen and electrical energy using autothermal reforming.

FIG. 2 illustrates another exemplary power generation system 150, wherein the reforming process to generate the fuel for the first turbine system 12 is produced in an auto-thermal reactor 152. An auto-thermal reforming process uses the concept of utilizing the heat generated from the catalytic partial oxidation (CPO) to enhance the steam reforming reaction which is endothermic and needs external heat input. The catalyst used in the auto-thermal reactor 152 herein promotes both GPO and steam reforming reaction. In another embodiment, the auto-thermal reactor 152 uses a diffusion flame in the beginning of the reactor to generate the heat required for the endothermic steam reforming reaction.

The primary reactions that occur over the CPO catalyst are indicated in reactions 3-5 below:

$$CH_4 + 1/2 O_2 = CO + 2H_2; \qquad (3)$$

$$CH_4 + 3/2 O_2 = CO + 2H_2O. \qquad (4)$$

$$CH_4 + 2O_2 = CO_2 + 2H_2O \qquad (5)$$

The GPO reactions are assisted by a third portion of compressed gas 92 from the first compressor 24, which third portion of the compressed oxidant 92 is directly introduced into the auto-thermal reactor 152 along with fuel 106. In some embodiments, a part of the steam 154 from the steam turbine 74 is supplied to the auto-thermal reactor 152 to assist the steam reforming reaction. As shown in FIG. 2, the first reformate stream 110 from the auto-thermal reactor 152 is introduced into a first heat exchanger 112 to generate a cooled first reformate stream 118. The cooled first reformate stream 118 may be introduced into a water gas shift reactor 113. The water gas shift reaction as shown in reaction (2) takes place in the water gas shift reactor 113. The water gas shift reaction is an exothermic reaction and generates a heated second reformate stream 119. The heated second reformate stream 119 is introduced into the second heat exchanger 121. The second heat exchanger 121 is configured to generate steam 125 from a water stream 123 by utilizing the heat content of the heated second reformate stream 119 and generate a cooled second reformate stream 127. The cooled second reformate stream 127 is introduced into the. The cooled second reformate 127 is introduced into a second carbon dioxide separator unit 162 to generate a stream rich on CO2 164 and a synthesis gas 158 comprising hydrogen, CO, CO2 and Nitrogen. In some embodiments, the synthesis gas 158 is introduced into the first combustion chamber 34 along with a supplementary fuel 160 (optional), which supplementary fuel 160 could be carbon based. The removal of CO2 in a pre-combustion stage helps in reducing the emission from the first turbine system 12. The embodiment shown in FIG. 2 does not isolate CO2 completely from the first cooled exhaust 68, but lowers the CO2 content in the first cooled exhaust 68 due to pre-combustion CO2 removal from the first turbine system 12 and the recirculation and separation of CO2 from the second turbine system 16.

The power generation systems disclosed herein have the flexibility to control the production of hydrogen or synthesis gas from the reformate stream from the reformer and generation of electrical energy depending on the demand. The hydrogen produced in the disclosed power generation system may be utilized in several ways. The hydrogen produced may be recycled to the combustor to be used as a fuel to achieve carbon dioxide free emission to atmosphere. The hydrogen produced may be stored and transported either in gaseous form or liquid form, such as by means of a liquefaction plant. The hydrogen produced may also be used as a fuel in a fuel cell to generate additional power.

The exemplary power generation systems as illustrated in FIGS. 1-2 have several advantages. The exemplary systems facilitate cleaner power generation along with CO₂ separation. The only exhaust stream released into the ambient from the system is the cooled first exhaust stream 68 from the first HRSG 56, which cooled first exhaust stream 68 is substantially free of CO₂. Therefore lower emission is achieved through this power generation system. The CO₂ generated in the process of combustion in the first combustion chamber 22 or in the hydrogen generation system 102 is separated using one or more CO₂ separator and the separated CO₂ can be suitable sequestered for oil recovery or sold in the merchant market depending on the demand for carbon dioxide. The energy content in the third exhaust gas from the hydrogen generation system enhances the combustion process in the second turbine system thereby increasing the overall efficiency of the plant. A part of the CO₂ lean stream is used in cooling the first turbine, further enhancing the overall efficient of the plant.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A power generation system comprising:
   a first gas turbine system comprising:
   a first combustion chamber configured to combust a first fuel stream of primarily hydrogen that is substantially free of carbon-based fuels;

a first compressor configured to supply a first portion of compressed oxidant to said first combustion chamber; and a first turbine configured to receive a first discharge from said first combustion chamber and generate a first exhaust and electrical energy;

a second gas turbine system comprising:

a second combustion chamber configured to combust a second fuel stream to generate a second discharge, wherein said first compressor of said first gas turbine system is configured to supply a second portion of compressed oxidant to said second combustion chamber; and a second turbine configured to receive said second discharge from said second combustion chamber to generate a second exhaust and electrical energy; and a second compressor configured to receive said second exhaust comprising carbon dioxide and to discharge a recycle stream to said second combustion chamber and a split stream to a separator system adapted to recover carbon dioxide; and a hydrogen generation system configured to receive a third fuel and steam to generate said first fuel and a third exhaust gas, wherein said third exhaust gas is introduced into said second combustion chamber, wherein said hydrogen generation system comprises:

a steam reforming zone configured to reform fossil-based fuels to generate a reformate comprising hydrogen;

at least one heat exchanger; and a hydrogen separator to generate an off gas stream, wherein said off gas stream is combusted in a combustor along with a third portion of compressed oxidant from said first compressor to supply heat to said steam reforming zone and generate said third exhaust gas.

2. The system of claim 1, wherein said hydrogen generation system further comprises a water gas shift reactor configured to convert carbon monoxide to carbon dioxide and hydrogen.

3. The system of claim 1, wherein said hydrogen separator employs pressure swing adsorption.

4. The system of claim 1, wherein said fuel is selected from the group consisting of natural gas, methane, methanol, ethanol, a stream comprising naphtha, butane, propane, diesel, kerosene, an aviation fuel, a coal derived fuel, a bio-fuel, an oxygenated hydrocarbon feedstock, and mixtures thereof.

5. The system in claim 1, wherein said fuel comprises natural gas.

6. The system of claim 1, wherein said oxidant is selected from a group consisting of air, oxygen rich air, oxygen depleted air, and pure oxygen.

7. The system of claim 1, wherein said oxidant is air.

8. The system of claim 1, wherein said separator system comprises a heat exchanger configured to recover heat from said split stream and a carbon dioxide separator configured to generate a carbon dioxide rich stream and a carbon dioxide lean stream.

9. The system of claim 8, wherein said heat exchanger comprises a cross-exchanger configured to recover heat from said split stream in exchange with said carbon dioxide lean stream from said carbon dioxide separator.

10. The system of claim 8, wherein said carbon dioxide separator comprises a membrane unit.

11. The system of claim 8, wherein a first portion of said carbon dioxide lean stream is recycled into said first combustion chamber for controlling the temperature and a second portion of said carbon dioxide lean stream is introduced into said first turbine for cooling.

12. The system of claim 1, further comprising a first heat recovery steam generator configured to recover heat from said first exhaust and generate a first portion of steam and a second heat recovery steam generator configured to recover heat from said second exhaust and generate a second portion of steam.

13. The system of claim 12 further comprising a steam turbine configured to receive said first portion of steam and second portion of steam.

14. The system of claim 13, wherein said at least one heat exchanger in said hydrogen generation system is configured to generate steam for said steam turbine.

15. The system of claim 12, wherein a part of said second portion of steam is recycled to said steam reforming zone.

16. A power generation system comprising:

a first turbine system configured to combust a first fuel comprising a hydrogen-rich stream substantially free of carbon-based fuels and to discharge a first exhaust substantially free of carbon dioxide;

a second turbine system configured to combust a second carbon-based fuel and to discharge a compressed stream rich in carbon dioxide to a carbon dioxide separator adapted to recover the carbon dioxide, wherein a compressor in the first turbine system is configured to supply air to said second turbine system; and a hydrogen generation system configured to receive a third fuel to generate said hydrogen-rich stream and an exhaust gas, wherein said exhaust gas is combusted in said second turbine system; wherein said hydrogen generation system comprises:

a steam reforming zone configured to reform fossil-based fuels to generate a reformate comprising hydrogen;

at least one heat exchanger; and a hydrogen separator to generate an off gas stream, wherein said off gas stream is combusted in a combustor along with a third portion of compressed oxidant from a compressor of said first turbine system to supply heat to said steam reforming zone and generate said exhaust gas;

wherein said power generation system does not discharge substantial amounts of carbon dioxide to the atmosphere.

17. A method comprising:

reforming a carbon based fuel in a hydrogen generation system and generating an exhaust gas by generating an off gas stream and combusting said off gas stream alone with a third portion of compressed oxidant from a first turbine system, combusting hydrogen from said hydrogen generation system and a first portion of compressed oxidant in said first turbine system;

discharging a first exhaust from said first turbine system that is substantially free of carbon dioxide;

introducing a second portion of compressed air from said first turbine system to a second turbine system;

combusting carbon-based compounds and said exhaust gas from said hydrogen generation system in said second turbine system and generating a second exhaust comprising carbon dioxide;

internally recycling within said second turbine system said second exhaust of said second turbine system to concentrate carbon dioxide within said second turbine system; and recovering said carbon dioxide from said second exhaust in a carbon dioxide separator.

* * * * *

UNITED STATES PATENT AND TRADEMARK OFFICE
CERTIFICATE OF CORRECTION

PATENT NO. : 7,634,915 B2  Page 1 of 1
APPLICATION NO. : 11/302554
DATED : December 22, 2009
INVENTOR(S) : Hoffmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

Ninth Day of November, 2010

David J. Kappos
*Director of the United States Patent and Trademark Office*